United States Patent [19]

Swerdloff et al.

[11] Patent Number: 4,517,004
[45] Date of Patent: May 14, 1985

[54] ARYL PHOSPHORIC TRIAMIDE AND ARYL PHOSPHORODIAMIDATE UREASE AND NITRIFICATION INHIBITORS AND UREASE AND NITRIFICATION INHIBITED UREA AND REDUCED NITROGEN BASED FERTILIZER COMPOSITIONS

[75] Inventors: Michael D. Swerdloff, Parsippany; Jaroslav F. Kolc, Randolph Township, Morris County; Milorad M. Rogic, Whippany, all of N.J.; Larry L. Hendrickson, Camillus, N.Y.

[73] Assignee: Allied Corporation, Morris Township, Morris County, N.J.

[21] Appl. No.: 502,395

[22] Filed: Jun. 8, 1983

[51] Int. Cl.$^3$ ................................................ C05C 9/00
[52] U.S. Cl. .......................................... 71/28; 71/902
[58] Field of Search ............................... 71/11, 27–30, 71/902

[56] References Cited

PUBLICATIONS

1978, CA, vol. 89, Abst. #89:89455k, Matzel et al.
1979, CA, vol. 90, Abst. #90:21340j, Oertal et al.
1979, CA, vol. 91, Abst. #91:122724p, Matzel et al.
1979, CA, vol. 91, Abst. #91:139619f, Heber et al.
1981, CA, vol. 94, Abst. #94:101951g, Vlek et al.
1981, CA, vol. 94, Abst. #94:139429f, Bayless et al.

Primary Examiner—Ferris H. Lander
Attorney, Agent, or Firm—Richard C. Stewart, II

[57] ABSTRACT

The invention relates to novel urease inhibited fertilizer compositions containing urea and a urease inhibiting amount of one or more aryl phosphoric triamide and aryl phosphorodiamidate compounds, and to methods and compositions for inhibiting the activity of urease through use of such compounds.

35 Claims, No Drawings

ARYL PHOSPHORIC TRIAMIDE AND ARYL PHOSPHORODIAMIDATE UREASE AND NITRIFICATION INHIBITORS AND UREASE AND NITRIFICATION INHIBITED UREA AND REDUCED NITROGEN BASED FERTILIZER COMPOSITIONS

BACKGROUND OF THE INVENTION

1. Field of the Invention

This invention relates to novel aryl phosphorictriamide and aryl phosphorodiamidate urease inhibitors, and to urease inhibited urea based fertilizer compositions. More particularly, this invention relates to urease inhibited urea based fertilizer compositions which contain certain aryl phosphoric triamide and/or aryl phosphorodiamidate compounds as the urease inhibitors, and methods of using such fertilizer compositions to increase plant yield. Yet another aspect of this invention relates to compositions and methods of inhibiting the catalytic activity of urease by use of such aryl phosphoric triamide and aryl phosphorodiamidate compounds.

2. The Prior Art

It is well known in the art to use urea and urea compositions in fertilizers, for application to the soil. The effective life of such fertilizers, however, is of short duration wherever microbiological activity exists in the soil to which the fertilizer is applied. This is due to the fact that urea is hydrolyzed rapidly, and nitrogen is lost in the form of ammonia, when urea is placed under or on the surface of soil which contains urease.

Urease, a crystallizable enzyme occurring in numerous bacteria and fungi, as for example *Micrococcus urease,* catalyzes the conversion of urea into ammonia and carbon dioxide. The reactions are as follows:

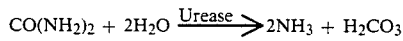

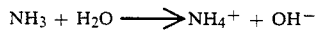

A portion of the ammonia thus formed is held by absorbing constituents of the soil and is available to plants as nutrient. However, a large amount of the ammonia may be lost to the air. A further problem resulting from the action of urease is the accumulation of ammonium species in the soil which may damage germinating seedlings and young plants.

One approach to the reduction of the problems resulting from the activity of soil urease toward soil applied urea is to find compounds that inhibit urease activity when applied to soils in conjunction with fertilizer urea. This approach has received considerable attention, and several classes of compounds have been used for this purpose.

For example the prior art describes various phosphoro compounds which are useful as urease inhibitors. Illustrative of such prior art are East German Pat. Nos. 142,714; 212,026; 122,177; 122,621 and 130,936, and Great Britain Pat. No. 1,494,774, which patents describe various phosphorodiamidates as urease inhibitors. U.S. Pat. No. 4,242,325 describes a method of controlling the enzymatic decomposition of urea to ammonia and carbonic acid due to the action of urease, which method comprises exposing the enzyme to certain phosphoric triamide compounds. U.S. Pat. No. 4,182,881 describes the use of certain N-(diaminophosphinyl)arylcarboxyamide compounds as inhibitors of the enzyme urease in the urinary tract. U.S. Pat. No. 4,225,526 describes the use of 8-[(4-aminophenyl)sulfonyl]amino-2-napthalenyl phosphorodiamidate compounds as inhibitors of the enzyme urease, and U.S. Pat. No. 4,222,948 describes the use of ([(4-aminophenyl)sulfonyl)amino]pheny phosphorodiamidate compounds as inhibitors of the enzyme urease.

Still other prior art describes phosphoric triamide compounds which are useful for other purposes, for example as flame proofing agents. For example, Great Britain Pat. No. 830,800 describes certain phosphoric triamide compounds which are useful as flame proofing agents.

SUMMARY OF THE INVENTION

In accordance with the present invention, there is provided a unique fertilizer composition comprising urea or a compound which is capable of forming urea when subjected to the use conditions of the composition, and a "urease inhibiting effective amount" of one or more aryl phosphoric triamide and/or aryl phosphorodiamidate compounds of the formula:

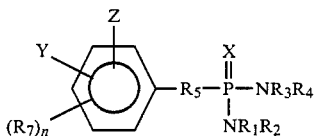

and acid salts thereof, wherein:

X is oxygen or sulfur;

n is 1,2 or 3;

Z and Y are the same or different and are hydrogen, alkyl, aryl, heterocycle, alkenyl, aralkyl, alkaryl, nitro, cyano, halogen, trihalomethyl, carboxy, carbamyl, alkylmercapto, amino, dialkylamino, phenoxy, sulfonic acid, hydroxy, mercapto, or alkoxy, or Z and Y together may form an alkylene or alkenylene chain which may optionally include one or more heteroatoms of divalent oxygen, sulfur or nitrogen to form a fused or spiro aromatic, cycloaliphatic or heterocyclic ring structure;

$R_1$, $R_2$, $R_3$ and $R_4$ are the same or different and are hydrogen or alkyl having from 1 to about 4 carbon atoms;

$R_5$ is divalent oxygen or a divalent moiety of the formula:

wherein:

$R_6$ is hydrogen, or unsubstituted or substituted phenyl, cycloalkyl or alkyl wherein permissible substituents are one or more halogen, mercapto, nitro, cyano, carboxyalkyl, amido, alkylmercapto, aryloxy, acyloxy, carboxy, amino, dialkylamino, N-diaminophosphinyl, O-diaminophosphinyl, S-diaminophosphinyl, N-(diaminophosphinyl)carbamyl, diaminophosphinyl, biscarboxyalkyl, alkylcarbonyl, alkoxycarbonyl, hydroxy and thiocyano groups; and $R_7$ is the same or different at each occurrence and is hydroxy, mercapto or a moiety of the formula:

wherein:

M is a metal cation; and $R_8$ and $R_9$ are the same or different and are selected from the group consisting of permissible $R_6$ groups; with the proviso that at least one $R_7$ group is substituted at the ortho or para position relative to the $R_5$ group and at least one of $R_5$ and $R_7$ contains a divalent oxygen bonded to the phenyl ring. In the present specification and claims, the term "phosphoro compounds" is used to refer to these compounds.

Another aspect of this invention relates to a method of enhancing the yield and/or growth of plants by distributing the composition of this invention in the "plant growth media" in which the plants are being grown within reach of the root system of the plants (hereinafter referred to as "root zone"). As herein, the term "plant growth media" refers to various natural and artificial media which support plant growth, including but not limited to soil, potting mixtures of organic and inorganic matter and artificial media such as polyurethane foam.

Yet another aspect of this invention relates to a method of inhibiting the urease catalyzed hydrolysis of urea applied to some plant growth media or other situs which comprises applying a "urease inhibiting effective amount" of one or more of the aforementioned phosphoro compounds to the plant growth media or other situs prior to, subsequent to or in conjunction with the application of urea to said plant growth media or situs and to a composition for carrying out such method. As used herein, a "urease inhibiting effective amount" is an amount of such phosphoro compounds which when admixed with urea, is capable of inhibiting the urease catalyzed hydrolysis of any urea in the plant growth media or at the other situs to any extent.

It has been discovered that by distributing an urease inhibiting effective amount of one or more of the phosphoro compounds in the plant growth media or at the other situs, the activity of urease in the media is suppressed thereby preventing rapid loss of urea from the media or situs. Furthermore, by proper distribution of the phosphoro compounds in the plant growth media or at the situs, the inhibition of the action of urease is effective over a prolonged period of time.

Still another more limited aspect of this invention relates to methods and compositions of inhibiting the nitrification of ammonium nitrogen which may be present in a plant growth media or other situs which comprises applying to said media or other situs a "nitrification-inhibiting effective amount" of one or more of the aforementioned phosphoro compounds.

As used herein, a "nitrification inhibiting effective amount" is an amount of one or more of the aforementioned phosphoro compounds which when admixed with ammonium nitrogen is sufficient to inhibit the nitrification of ammonium nitrogen to nitrate nitrogen to any extent. The ammonium nitrogen in a plant growth media may arise from the addition of one or more reduced nitrogen fertilizer to the plant growth media or formed in the media by conversion of the organic constituents in the media.

DETAILED DESCRIPTION OF THE INVENTION

The application of a "urease inhibiting effective amount" and/or "nitrification inhibiting effective amount" of one or more of the above-identified phosphor compounds is essential for the practice of one embodiment of this invention. Usually, the amount of the one or more phosphoro compounds required to inhibit the activity of urease is equal to that required for inhibition of nitrification. While the above-identified phosphoro compounds are effective to inhibit urease activity and to inhibit nitrification regardless of situs, the compounds are especially adapted to perform such functions in soil or some other plant growth media. The amount of the phosphoro compound impregnated or distributed in the plant growth media is an amount which is sufficient to inhibit the urease catalyzed hydrolysis of all or a portion of the urea present in the media and/or sufficient to inhibit nitrification of all or a portion of the ammonium nitrogen percent in the media. In the preferred embodiments of the invention, the plant growth media is impregnated with at least about 0.01 parts of said one or more phosphoro compounds per 1,000,000 parts of the plant growth media. Hereinafter, the abbreviation of "p.p.m." designates parts of one or more phosphoro compounds per million parts of soil or other plant growth media. In the preferred embodiments of this invention, the amount of said phosphoro compounds impregnated in the plant growth media is from about 0.01 to about 5000 p.p.m, and in the particularly preferred embodiments of the invention is from about 0.2 to about 1000 p.p.m. on the same basis. Amongst these particularly preferred embodiments, most preferred are those embodiments in which the weight percent of said one or more phosphoroamide compounds is from about 1 to about 500 p.p.m.

Within the aforementioned limitations, the preferred amounts of the one or more phosphoro compounds impregnated or distributed in the growth media are dependent upon the particular situation. Thus, in determining the amount to be employed, consideration is made not only of the treatment need, i.e., soil pH, temperature, soil type, etc., but also of the mode of application to soil. When the one or more phosphoro compounds are applied in a broadcast application, the amount in p.p.m. is frequently less than in row or band application where, for a substantial depth and width within the vicinity of application, there can be a very high concentration of the one or more phosphoro compounds. When application is made near the root zone of growing plants or when application is made immediately prior to seeding or transplanting, the amounts supplied are frequently at a lower rate than when application is made at the end of the growing season to prepare the soil for the following season. By dispersing very large dosages in the plant growth media, a prolonged inhibition of urease activity and/or nitrification can be obtained over a period of many months. The concentration of the one or more phosphoro compounds is eventually reduced to a minimum by decomposition in the soil.

In one method for carrying out the present invention, one or more phosphoro compounds are distributed throughout the plant growth media in a broadcast application, such as by spraying, dusting, distributing in irrigation water, etc. In such application, the one or more phosphoro compounds are supplied in amounts sufficient to permeate the growing area of the plant growth media with an urease and/or nitrification inhibiting effective amount of such compounds. In field administration, the one or more phosphoro compounds can be distributed in the plant growth media in an amount and through such cross-section of the media as to provide for the presence therein of a urease and/or nitrification inhibiting effective amount of the one or more phosphoro compounds. It is usually preferred that the one or more phosphoro compounds be distributed to a depth of at least two inches below the surface of the plant growth media.

In another method for carrying out the present invention, one or more phosphoro compounds are administered to a plant growth media in a band or row application. In such application, administration is made with or without a carrier in amounts sufficient to supply to the soil or growth media a concentration of the one or more phosphoro compounds which can be as high as 5000 p.p.m. or more. After administration with or without discing or dragging, subsequent irrigation or rainfall distributes the one or more phosphoro compounds throughout the plant growth media.

In one embodiment of the present invention, the one or more phosphoro compounds are distributed throughout the plant growth media prior to seeding or transplanting the desired crop plant.

In another embodiment, the soil in the root zone of growth plants is treated with the one or more phosphoro compounds in an amount sufficient to inhibit the action of urease and/or to inhibit nitrification, but sublethal to plant growth. By following such practice, no adverse effect is exerted by the one or more phosophoro compounds upon growth of seeds or plants. Oftentimes, it is desirable to treat the soil or plant growth media adjacent to plants, and this procedure may be carried out conveniently in side-dressing operations.

In a further embodiment, soil or plant growth media can be treated with the one or more phosphoro compounds following harvest to prevent rapid loss of urea and/or ammonium nitrogen, and to prevent the buildup of soil urease and/or materials which promote nitrification. Such practice conserves the soil nitrogen for the following growing season. In such application, the upper limit is primarily an economic consideration.

In an additional embodiment, the soil or plant growth media is treated with the one or more phosphoro compounds in conjunction with the application of urea and/or one or more reduced nitrogen fertilizers, or one or more compounds capable of forming urea or such reduced nitrogen fertilizers in situ on application to the growth media. Urea and reduced nitrogen fertilizers are well known commercially available compounds, and will not be discussed herein in detail. Illustrative of compounds which are believed to form urea on addition to the soil are water soluble formaldehyde condensation products, as for example, methylolureas, methyleneureas and mixtures thereof. These products and a method for their preparation are described in detail in U.S. Pat. No. 3,462,256. Still other useful sources of urea are water-insoluble urea formaldehyde condensation products such as ureaform. Illustrative of useful water-insoluble urea and formaldehyde condensation products are those whose preparation and use are described in detail in U.S. Pat. Nos. 3,677,736 and 4,033,745. The expression "reduced nitrogen fertilizers" is employed in the present specification and claims as understood in the art, and embraces both inorganic and organic nitrogenous materials containing nitrogen in the reduced state. Examples of known reduced nitrogen fertilizers include anhydrous and aqueous ammonia, inorganic ammonium salt such as ammonium phosphate, ammonium nitrate and ammonium sulfate, ammonium salts of organic acids, urea, cyanamide, guanidine nitrate, dicyandiamide, amino acids, guanyl urea sulfate, thiourea, amines, ureaform and other nitrogen-containing organic chemical fertilizers as well as protein mixtures, animal tankages, green manure, fish products, crop residues and other natural materials known to be sources of ammonium ions in plant growth media, particularly in soil. These fertilizer materials contain nitrogenous compounds in which the apparent valency or oxidation state of the nitrogen is from $-3$ to $-1$, inclusive.

The present invention can be carried out by distributing the one or more phosphoro compounds in an unmodified form through a plant growth medium. The present method also embraces distributing one or more such compounds as a constituent in liquid or finely divided solid compositions.

The concentration of one or more phosphoro compounds in compositions to be employed for the treatment of growth media is not critical and can vary considerably provided the required dosage of effective agent is supplied to the growth media. In general, good results are obtained with liquid and/or solid compositions containing at least about 0.00001 percent by weight of the one or more phosphoro compounds based on the total weight of the composition. In the preferred embodiments of the invention, the weight percent of one or more phosphorodiamide compounds is from about 0.001 to about 98 on the aforementioned basis. In the particularly preferred embodiments of the invention, the weight percent of the one or more phosphorodiamide compounds is from about 0.002 to about 50 weight percent, and in the most perferred embodiments is from about 0.01 to about 20 weight percent on the aforementioned basis. Liquid or dust compositions in which the one or more phosphoro compounds are present in higher concentration can be utilized as such or can be employed as concentrate compositions to be diluted to prepare actual treating compositions.

In these compositions, the one or more phosphoro compounds can be modified with one or more additaments or soil treating adjuvants including water, petroleum distillates or other liquid carriers, surface-active dispersing agents, inert finely divided solids and fertilizers, such as urea and/or reduced nitrogen fertilizers or compounds capable of forming urea or such, reduced nitrogen fertilizers in situ. The adjuvants cooperate with the one or more phosphoro compounds so as to facilitate the practice of the present invention and to obtain an improved result. Preferred adjuvants are surface-active dispersing agents, inert finely divided solids, and especially, reduced nitrogen fertilizers and/or urea, and their precursor compounds. The amount of urea and/or reduced nitrogen comfertilizer, or precursor compounds included in the composition of this invention is not critical to the unique advantages thereof, and any amount of urea and/or such compounds or fertilizer used in conventional fertilizers can be used. Normally, the amount employed will vary widely depending on a number of factors, including the times and frequency of application. In the preferred embodiments of the invention, the total quantity of urea and/or reduced nitrogen fertilizers may vary from about 0.5 to about 95 weight percent based on the total weight of the composition and in the particularly preferred embodiments may vary from about 1 to about 50 weight percent on the same basis. In the most preferred embodiments of this invention, the quantity of urea and/or reduced nitrogen fertilizer will vary from about 3 to about 40 weight percent on the aforementioned basis.

The composition of this invention may include other optional ingredients known to those of skill in the art for inclusion in fertilizer compositions. For example, the composition may include sources of potassium, sulfur, phosphorus, boron, zinc, iron, manganese, copper, molybdenum, cobalt and like micronutrients and macronutrients which may be deficient in the soil. The composition may also include plant growth regulators, as for example auxins, cytokinins and the like, as well as pesticides such as insecticides, miticides, herbicides, nematocides and the like.

The compositions of this invention containing urea and/or reduced nitrogen fertilizers can be conveniently used in the practice of the method of this invention to increase yields in a wide variety of plants including legume crop plants and cereal crop plants. For example, the required amounts of the fertilizer composition of this invention can be applied to the soil immediately surrounding the plant, i.e., a radius up to about 20 feet, at a rate of application sufficient to obtain the desired increase in plant yield. The rate of application will depend on a number of factors, such as environmental conditions, type of crop plant and the like. The composition is usually applied at a rate of from about 5 to about 600 lbs. of urea and/or reduced nitrogen nutrient per acre in a total applied aqueous volume of from about 3 to about 1500 gallons per acre. In the preferred embodiments of the method of this invention, the composition is applied at a rate of from about 2 to about 100 pounds of urea and/or reduced nitrogen nutrient per acre in a total applied aqueous volume of from about 6 to about 250 gallons per acre, and in the particularly preferred embodiments at a rate of from about 3 to about 30 pounds per acre in a total volume of from about 9 to about 25 gallons per acre. The composition can be used in the soil or applied to the foliage of the plant, upon the seeds, or the roots of plants without injuring either the foliage, seeds or roots at any time during the growing cycle. Because of the action of the novel urease and/or nitrification inhibitors present in the composition, nitrification and/or all or a portion of the urease present at the situs of application will be inhibited and greater amounts of these urea and/or reduced nitrogen nutrients will be made available to the plant for longer periods of time.

Liquid compositions containing the desired amount of the one or more phosphoro compounds can be prepared by dispersing the latter in one or more liquid carriers such as water or an organic solvent with or without the aid of a suitable surface active dispersing agent or emulsifying agent. Suitable organic solvents include acetone, diisobutylketone, methanol, ethanol, isopropyl alcohol, diethyl ether, toluene, methylene chloride, chlorobenzene and petroleum distillates. The preferred organic solvents are those which are of such volatility that they leave little permanent residue in the growth media. Dispersing and emulsifying agents which can be employed in liquid compositions include anionic, cationic, noniomic and anphoteric dispersing and emulsifying agents such as condensation products of alkylene oxides with phenols and organic acids, alkyl aryl sulfonates, polyoxy-alkylene derivatives or sorbitol ester, sugar esters, complex ether alcohols, mahogany soaps quaternary ammonium compounds and the like. The surface active agents are generally employed in the amount of from about 1 to about 20 percent by weight of one or more of the phosphoro compounds based on the total weight of the composition and preferably from about 1 to about 10 weight percent on the same basis.

Solid compositions containing the active one or more phosphoro compounds can be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with one or more solid phosphoro compounds or wet with one or more liquid phosphoro compounds or wet with a solution or dispersion of one or more solid or liquid phosphoro compounds in a volatile organic solvent. Depending upon the proportions of ingredients, these compositions can be employed without further modification or be considered concentrates and subsequently further diluted with solid surface active dispersing agents, talc, chalk, gypsum or the like to obtain the desired treating composition. Furthermore, such concentrate compositions can be dispersed in water with or without added a dispersing agent or agents to prepare aqueous soil treating compositions.

The required amount of the one or more phosphore compounds contemplated herein may be applied per acre treated in from about 1 to about 200 gallons or more of liquid carrier and/or diluent or in from about 5 to about 500 pounds of inert solid carrier and/or diluent. The concentration in the liquid concentrate will usually vary from about 10 to about 95 percent by weight and in the solid formulations from about 0.5 to about 90 percent by weight. Satisfactory sprays, dusts, or granules for general use contain from about 1/4 to about 15 pounds of active one or more phosphoro compounds per acre.

The compounds contemplated herein prevent or retard the urease catalyzed hydrolysis of urea, and they have relatively high residual activity. With respect to plants they have a high margin of safety in that when used in sufficient amount to inhibit the activity of urease, they do not burn or injure the plant, and they resist weathering which includes wash-off caused by rain, decomposition by ultra-violet light, oxidation, or hydrolysis in the presence of moisture or, at least such decomposition, oxidation, and hydrolysis as would materially decrease the desirable urease inhibiting characteristic of the compounds or impart undesirable characteristics, for instance, phytotoxicity, to the compounds. The compounds are so chemically inert that they are compatible with substantially any other constituents of the spray schedule, and they may be used in the soil, upon the seeds, or the roots of plants without injuring either the seeds, or the roots of plants.

While the composition and method of this invention are particularly suited for agricultural applications for prevention or inhibition of urease catalyzed hydrolysis of urea and/or nitrification, they can also be used in other applications where inhibition of the activity of urease and/or nitrification is desired. For example, such other applications include use as urease inhibitors in animal litters, as feed additives, pharmaceutical applications, urease inhibition in mammalian urinary tracts, and the like. It should be noted that while all of the above referenced compounds exhibit some level of urease inhibiting activity, the particularly active compound employed in one application may not necessarily be useful in another application. Thus, in the selection of a particular active material for use in an application, such factors as toxicity of the material, the environment in which the material will be used, level of urease inhibition desired and the like must be considered in selecting such material.

The phosphoro compounds which are employed as urease inhibitors in the composition and method of this invention are those of the formula:

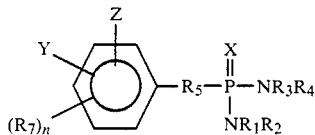

wherein:

X is oxygen or sulfur:

n is 1,2 or 3;

Z and Y are the same or different and are hydrogen, alkyl, aryl, heterocycle, alkenyl, aralkyl, alkaryl, nitro, cyano, halogen, trihalomethyl, hydroxy, mercapto, carbamyl, carbonyl, alkylmercapto, amino, dialkylamino, phenoxy, carboxy, sulfonic acid, alkoxy, or Z and Y together may form an alkylene or alkenylene chain which may optionally include one or more heteroatoms of divalent oxygen, sulfur or nitrogen to form a fused or spiro aromatic, cycloaliphatic or heterocylic ring structure;

$R_1$, $R_2$, $R_3$ and $R_4$ are the same or different and are hydrogen or alkyl having from 1 to about 4 carbon atoms;

$R_5$ is divalent oxygen or a divalent moiety of the formula

wherein:

$R_6$ is hydrogen, or unsubstituted or substituted phenyl, cycloalkyl or alkyl wherein permissible substituents are one or more halogen, mercapto, nitro, cyano, amido, carboxyalkyl, alkymercapto, aryloxy, acyloxy, carboxy, amino, N-diaminophosphinyl, O-diaminophosphinyl, S-diaminophosphinyl, N-(diaminophosphinyl)carbamyl dialkylamino, diaminophosphinyl, bis-carboxyalkyl, alkoxycarbonyl, hydroxy and thiocyano groups; and $R_7$ is the same or different at each occurrence and hydroxy, mercapto or a moiety of the formula:

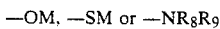

wherein:

M is a metal cation; and $R_8$ and $R_9$ are the same or different and are selected from the group consisting of permissible $R_6$ groups; with the proviso that at least one $R_7$ group is substituted at the ortho or para position relative to the $R_5$ group, and that at least one of $R_5$ and $R_7$ contains a divalent oxygen bonded to the phenyl ring.

Illustrative of permissible Y and Z substituents are amino, methylamino, phenyl, piperazinyl, indanyl, allyl, methoxy, ethyoxy, ethyl, methyl, chloro, bromo, carbamyl, carboxy, cyano, iodo, fluoro, acetyl, hexanoyl, hydroxy, phenoxy, 2-propenyl, benzyl, 2,4-dimethylphenyl, trichloromethyl, methylmercapto, sulfonic acid, dimethylamino, ethylmercapto, amino, trifluoromethyl, nitro, 3-butenyl, 4-methylphenyl and the like.

Exemplary of useful $R_1$, $R_2$, $R_3$ and $R_4$ substituents are hydrogen, methyl, ethyl, propyl, isopropyl, butyl and isobutyl.

Permissible $R_5$ groups include divalent oxygen, amino, methylamino, ethylamino, propylamino, hexylamino, phenylamino, 2,4-dimethylphenylamino, isopropylamino, 2-chloroethylamino, 3-chloropropylamino, 4-chlorobutylamino, 2-iodopropylamino, 2-cyanoethylamino, iodomethylamino, 2-phenoxyethylamino, 3-bromopentylamino, 5-chloropentylamino, 2-methoxyneopentylamino, 2-iodo-2-phenylethylamino, 2-isopropoxyethylamino, 2-(2'-naphthoxy)ethylamino, 2,2-dichloropropylamino, 3-mercaptobutylamino, 2-acetylpropylamino, cyclopropylamino, cyclopentylamino, phenylmercaptomethylamino, cyclohexylamino, 3,4-dichlorohexylamino, phenoxy, ethylamino, thiocyanoethylamino, 2-isocyanoethylamino, 2-isocyanatopropylamino, 3-aminopropylamino, 2-dimethylaminoethylamino, 6-N-methylaminohexylamino, caproylmethylamino, benzylamino, 2-cyanobut-3-enylamino,, 3-methoxypent-4-enylamino, 1-iodo-N,2-dimethylprop-2-enylamino, 4-methylpenytlamino, 2,4-dimethylhexylamino, 4-trifluoromethylphenylamino, 2,4-dichlorophenylamino, 4-acetylphenylamino, 3-carboxymethylphenylamino, 2-cyanophenylamino, 4-phenoxyphenylamino, 2-methyoxycarbonylphenylamino, 2-aminophenylamino, 2-(N,N-dimethylaminophenyl)-amino, and the like. Illustrative of useful $R_7$ groups are methylamino, phenylamino, dimethylamino, amino, ethylamino, methylphenylamino, hydroxy, mercapto, $-O^-Na^+$, $-S^{-Na+}$, $O^-K^+$, diphenylamino, cyclohexylamino, 2-chloropropylamino and the like.

The following compounds are illustrative of phosphoro compounds within the purview of the above structural formula which can be prepared simply by selecting appropriate reactants for use in the procedures described below and which can be employed in the practice of this invention.

2-hydroxyphenylphosphorodiamidate 2,4-dihydroxyphenylphosphorodiamidate 2-cyano-4-hydroxyphenylphosphorodiamidate 2-(dimethylamino)-4-hydroxyphenyl phosphorodiamidate 2-(2'-phenacylethyl)-4-hydroxyphenyl phosphorodiamidate 1-chloro-2-prop-2'-enyl-4-hydroxyphenyl phosphorodiamidate 2-(phenylsulfonyl)-4-hydroxyphenyl diamidophosphorothionate 2-(2'-nitroethyl)-4-hydroxyphenylphosphorodiamidate 2-hydroxymethyl-4-hydroxyphenylphosphorodiamidate 2-(2'-chloroethyl)-4-hydroxyphenylphosphorodiamidate 3-methoxymethyl-4-hydroxyphenylphosphorodiamidate potassium salt 4-benzyl-2-hydroxyphenylphosphorodiamidate 2-hexyl-4-hydroxyphenylphosphorodiamidate 2-propenyl-4-hydroxyphenylphosphorodiamidate 4-hex-5'-enyl-6-hydroxylphenylphosphorodiamidate 3-cyclohexenyl-4-hydroxylphenylphosphorodiamidate 2-cyclopentenyl-4-hydroxyphenylphosphorodiamidate 4-hydroxynaphthyl)phosphorodiamidate 2,3-dimethyl-4-hydroxyphenylphosphorodiamidate 2,4-dichloro-6-hydroxyphenylphosphorodiamidate 4-trifluoromethyl-2,6-dihydroxyphenylphosphorodiamidate disodium salt
2-acetyl-4,6-dihydroxyphenylphosphorodiamidate
2-chloro-3,4-hydroxyphenylphosphorodiamidate calcium salt
3-chloro-2-prop-2-enyl-4-hydroxyphenylphosphorodiamidate
4-methoxyphenyl-2-hydroxyphenylphosphorodiamidate
6-dichloromethyl-2,3-dihydroxyphenyldiamidophosphorthionate
2-trichloromethyl-4-hydroxyphenyldiamidophosphorodiamidate
3-(2',2'-difluoroethyl)-4-hydroxyphenyldiamidophosphorothionate
4-hydroxy-2-(3'-chloropropyl)phenyldiamidophosphorothionate sodium salt
3-mercaptophenyl-4-hydroxyphenyldiamidophosphorothionate
2-phenylthiophenyl-4-hydroxyphenylphosphorodiamidate
3-phenoxyphenyl-4-hydroxyphenylphosphorodiamidate
3-cyano-6-propyl-4-hydroxyphenyldiamidophosphorothionate potassium salt
2(2'-phenoxyethyl)-4-hydroxyphenyldiamidophosphorothionate
2-2'-oxopentyl)-4-hydroxyphenylphosphorodiamidate
2-(2'-phenylmercaptoethyl)-4-hydroxydiamidophosphorothionate
3-(2'-chloropropyl)-4,6-dihydroxyphenyldiamidophosphorothionate
3-(2',2'-diiodopropyl)-4-hydroxyphenyldiamidophosphorothionate
5-(2',2'-difluoroethyl)-2,4-dihydroxyphenyldiamidophosphorothionate
2-(cyclopentyl)-4-hydroxyphenylphosphorodiamidate
3-(cyclopropyl)-2,4-dihydroxyphenylphosphorodiamidate
2-(2'-propynyl)-4-hydroxyphenylphosphorodiamidate
3-chloro-2-(prop-2'-ynyl-4-hydroxyphenyldiamidophosphorothionate
2-(3-phenylpropyl)-4-hydroxyphenylphosphorodiamidate
2-(3'-thienyl)-5-hydroxyphenylphosphorodiamidate
2-(3'pyridyl)-4-hydroxyphenylphosphorodiamidate
3'-(2'-pyrrolidyl)-2,4-dihydroxyphenyldiamidophosphorothionate
4-(2'-furyl)-2-hydroxyphenylphosphorodiamidate
2-(3'-furyl)-4-hydroxyphenylphosphorodiamidate
4-(3'-pyranyl)-2,6-dihydroxyphenylphosphorodiamidate
2,4,6-trihydroxyphenylphosphorodiamidate
2,4-dihydroxyphenylphosphorodiamidate
4-hydroxy-2-(2'-imidazolyl)phenyldiamidophosphorothionate
3-hydroxy-4-(2'-imidazolyl)phenylphosphorodiamidate
5-hydroxy-4-amino-3-(1'-indanylmethyl)phenylphosphorodiamidate
2-hydroxy-4-indenylphosphorodiamidate
7-hydroxy-4-indolylphosphordiamidate
4-hydroxy-2-isocyanophenylphosphorodiamidate
2,4-dihydroxy-6-N,N'-(dimethylamino)phenylphosphorodiamidate
3,5-dipropyl-6-hydroxyphenyldiamidophosphorothionate
2,3-dimethyl-4-amino-6-hydroxyphenyldiamidophosphorothionate
3-isopropyl-4-hydroxyphenylphosphorodiamidate
2-chloro-4-amino-6-hydroxyphenylphosphorodiamidate
3-(2'-pyrrolyl)-4-hydroxyphosphorodiamidate
2-(4'-pyrimidyl)-4-hydroxyphenylphosphorodiamidate
2-(2'-thiocyanoethyl)-4-hydroxyphenylphosphorodiamidate
3-hydroxy-4-butylphenylphosphorodiamidate
2,5-dihydroxyphenylphosphorodiamidate
3-hydroxy-4-methylmercaptophenylphosphorodiamidate
2-(3'-oxobutyl)-4-hydroxyphenylphosphorodiamidate
4-hydroxy-2-isocyanatophenylphosphorodiamidate
2,3-dihydroxy-6-propylphenylphosphorodiamidate
2-hydroxy-6-aminophenylphosphorodiamidate
2,6-dihydroxy-4-aminophenylphosphorodiamidate
2,3-dihydroxy-4-methylphenylphosphorodiamidate
7-hydroxy-4-benzothiazolylphosophorodiamidate
7-hydroxy-4-benzofuranylphosphorodiamidate
7-hydroxy-4-benzothienyldiamidophosphorothionate
2-(2'-thiocarbamoylethyl)-4-hydroxyphenyldiamidophosphorothionate
2-methyl-4-(3'-αpyrone)hydroxyphenylphosphorodiamidate
6-methyl-2-(4'-αpyrone)-4-hydroxyphenylphosphorodiamidate
2-hydroxy-4,6-diaminophenylphosphorodiamidate
2,4-dihydroxy-6-methylphenylphosphorodiamidate
4-hydroxy-5,6,7,8-tetrahydro-1-naphthylenylphosphorodiamidate
2-propargyl-4-hydroxyphenylphosphorodiamidate
7-hydroxy-4-benzimidazolephosphorodiamidate
3-nonyl-4-hydroxyphenylphosphorodiamidate
2-oleyl-4-hydroxyphenyphosphorodiamidate
5-hydroxy-8-quinolinylphosphorodiamidate
4-hydroxyphenylphosphorodiamidate lithium salt
N-cyclohexyl-N-(2-hydroxyphenyl)phosphoric triamide
N-cyclopropyl-N-(3-nitro-4-hydroxyphenyl)phosphoric triamide
N-methyl-N-(2-chloro-4-hydroxyphenyl)phosphoric triamide
N-propyl-N-(4-mercapto-3,5-dihydroxyphenyl)phosphoric triamide
N-prop-2-enyl-N-(2,3-dimethyl-4-hydroxyphenyl)phosphoric triamide
N-cyclopentyl-N-(4-amino-2-hydroxyphenyl)phosphoric triamide sodium salt
N-methyl-N-(2,4-diamino-3-hydroxyphenyl)phosphoric triamide
N-methyl-N-(2-hydroxyphenyl)phosphoric triamide
N-methyl-N-(4-hydroxyphenyl)phosphoric triamide
N-hexyl-N-(4-dimethylamino-2-hydroxphenyl)phosphoric triamide
N-butyl-N-(3-methylamino-4-hydroxphenyl)phosphoric triamide
N-benzyl-N-(4-phenylmercapto-2-hydroxphenyl)phosphoric triamide
N-(2'-phenylethyl)-N-(4-hydroxphenyl)phosphoric triamide
N-(5'-phenylpentyl)-N-(2-hydroxphenyl)phosphoric triamide
N-cyclohexyl-N-(4-hydroxphenyl)phosphoric triamide
N-(allyl)-N-(3-acetyl-4-hydroxphenyl)phosphoric triamide
N-ethyl-N-(2,4 -dimethoxy-3-hydroxphenyl)-phosphoric triamide N-(3-hexenyl)-N-(4,5-dihydroxy-2-acetamidophenyl)-phosphoric triamide magnesium salt
N-acetyleneyl)-N-(4,5-dihydroxy-3-trifluoromethylphenyl)phosphoric triamide
N-(3-cyclohexenyl)-N-(3-acetoxy-4,5-dihydroxyphenyl)phosphoric triamide
N-propyl-N-(2,4-dichloro-3-hydroxyphenyl)-phosphoric triamide
N-ethyl-N-(2-biphenylcarbonyl-4-hydroxyphenyl)-phosphoric triamide
N-cyclohexyl-N-(2,3-difluoro-4-hydroxyphenyl)-phosphoric triamide
N-methyl-N-(2,3-dibromo-5-hydroxyphenyl)-phosphoric triamide
N-(4'-hexynyl)-N-(3-mercapto-4-hydroxyphenyl)phosphoric triamide potassium salt
N-methyl-N-(4-phenoxy-6-hydroxyphenyl)-phosphoric triamide
N-methyl-N-(2,3-dinitro-4-hydroxyphenyl)-phosphoric triamide
N-ethyl-N-(4-amino-6-hydroxyphenyl)phosphoric triamide
N-isopropyl-N-(3-cyano-4-hydroxyphenyl)-phosphoric triamide
N-methyl-N-(2-chloro-4-nitro-6-hydroxyphenyl)-phosphoric triamide
N-benzyl-N-(2-methyl-4-amino-6-hydroxyphenyl)-phosphoric triamide
N-butyl-N-(2-methyl-4-methoxy-6-hydroxyphenyl)-phosphoric triamide
N-methyl-N-(2-trichloromethyl-4-chloro-6-hydroxyphenylphosphoric triamide
N-hexyl-N-(4-ethoxy-6-hydroxyphenyl)phosphoric triamide
N-methyl-N-(2-oxazinyl-4-hydroxyphenyl)-phosphoric triamide
N-methyl-N-(3-oxazolidinyl-6-hydroxyphenyl)phosphoric triamide
N-methyl-N-(4-oxathiazinyl-3-hydroxyphenyl)phosphoric triamide
N-ethyl-N-(3-thiazinyl-4-hydroxyphenyl)phosphoric triamide
N-methyl-N-[(2-(2'-thiazolidinyl)-4-hydroxyphenyl)]-phosphoric triamide sodium salt
N-methyl-N-(4-hydroxy-1-naphthyl)phosphoric triamide
N-propyl-N-(2-phenyl-3-mercapto-4-hydroxyphenyl)-phosphoric triamide
N-methyl-N-(3-methylmercapto-2-triazolyl-4-hydroxyphenyl)phosphoric triamide
N-methyl-N-(2,4-dimethylamino-5-hydroxyphenyl)-phosphoric triamide
N-ethyl-N-(3-diazinyl-4-hydroxyphenyl)phosphoric triamide
N-ethyl-N-(2,3,4-triamino-6-hydroxyphenyl)-phosphorothioic triamide
N-isopropyl-N-(4-hydroxyphenyl)phosphorothioic triamide
N-methyl-N-[(2-(3-pyridyl)-4-hydroxyphenyl]-phosphoric triamide
N-isobutyl-N-[3-(4-hydroxyquinolinyl)]phosphoric triamide
N-methyl-N-(2-hydroxy-5,6,7,8-tetrahydro-1-naphthyl)phosphoric triamide
N-methyl-N-[4-(2-hydroxyquinaldinyl)]phosphoric triamide
N-methyl-N-(2-hydroxyphenyl)phosphoric triamide
N-methyl-N-[(2-(5'-pyrazinyl)-4-hydroxyphenyl)]phosphoric triamide
N-tert-butyl-N-(2-hydroxyphenyl)phosphoric triamide
N-methyl-N-(3-trichloromethyl-5-thiadiazolidyl-6-hydroxyphenyl)phosphoric triamide
N-sec-butyl-N-(2,4-dihydroxy phenyl)phosphoric triamide
N-methyl-N-[3-(2'-picolinyl)]phosphoric triamide
N-ethyl-N-[2-(4'-chloropyridinyl)-4-hdyroxyphenyl]-phosphoric triamide
N-octyl-N-(2,4,6-dihydroxyphenyl)phosphoric triamide
N-oleyl-N-(2,6-dihydroxyphenyl)phosphoric triamide
N-(1'-isopentenyl)-N-(2,4-dimethoxy-6-hydroxyphenyl)phosphoric triamide
N-(2'-propargyl)-N-(2,3-dihydroxyphenyl)phosphoric triamide
N-allyl-N-(3-hydroxyphenyl)phosphoric triamide
N-)2-chloro-4-hydroxyphenyl)phosphoric triamide
N-(3-methyl-4-hydroxyphenyl)phosphoric triamide
N-(3-nitro-4-hydroxyphenyl)phosphoric triamide
N-(3-cyano-2,4-dihydroxyphenyl)phosphoric triamide
N-(4-dimethylamino-3-hydroxyphenyl)phosphoric triamide
N-(2-methoxy-4-hydroxyphenyl)phosphoric triamide
N-(3-butoxy-4-hydroxyphenyl)phosphoric triamide
N-(2,3-dibromo-4-hydroxyphenyl)phosphoric triamide sodium salt
N-(4-hydroxyphenyl)phosphorothioic triamide
N-(4-hydroxyphenyl)phosphorothioic triamide potassium salt
N-(3-isopropyl-4-hydroxyphenyl)phosphorothioic triamide
N-(3,4-dihydroxyphenyl)phosphoric triamide
N-(3-methylamino-4-hydroxyphenyl)phosphoric triamide
N-(2-hydroxyphenyl)phosphoric triamide
N-(3-tert-butyl-4-hydroxyphenyl)phosphorothioic triamide
N-methyl-N'-(4-hydroxyphenyl)phosphoric triamide
N,N'-dimethyl-N'-(4-hydroxyphenyl)phosphoric triamide
N-methyl-N'-(4-hydroxyphenyl)phosphorothioic triamide
N,N'-diethyl-N''-(4-hydroxyphenyl)phosphoric triamide
N-ethyl-N'-methyl-N''-(3-methyl-4-hydroxyphenyl)-phosphoric triamide Preferred for use in the practice of this invention are phosphoro compounds of the above referenced formula in which:

X is oxygen;

n is 1 or 2;

Y and Z are individually halogen, hydrogen, alkyl having from 1 to about 7 carbon atoms, nitro, trifluoromethyl, cyano, carboalkoxy, hydroxy, amino or alkoxy;

$R_1$, $R_2$, $R_3$ and $R_4$ are the same or different and are hydrogen or methyl; and $R_5$ is divalent oxygen or a divalent moiety of the formula:

wherein:

$R_6$ is hydrogen, or substituted or unsubstituted alkyl, cycloalkyl or phenyl wherein permissible substituents are one or more halogen, cyano, nitro, alkoxy, alkyl, phenyl, or phenoxy substituents; and $R_7$ is hydroxy, mercapto, amino, or a moiety of the formula —OM or —SM wherein:

M is a metal cation.

Particularly preferred for use in this invention are phosphoro compounds in which:

X is oxygen;

n is 1 or 2;

Y and Z are individually hydrogen, amino, nitro, methyl, ethyl, methoxy, ethoxy, carboxy, cyano, chloro, bromo, or fluoro;

$R_1$, $R_2$, $R_3$ and $R_4$ are hydrogen; and $R_5$ is oxygen or a moiety of the formula:

wherein:

$R_6$ is hydrogen, alkyl, phenylalkyl, cycloalkyl or phenyl; and $R_7$ is hydroxy, mercapto or a moiety of the formula:

—OM or —SM wherein:

M is an alkali or alkaline earth metal cation.

Amongst these particularly preferred embodiments of the invention, most preferred are those embodiments in which said phosphoro compounds are of the formula:

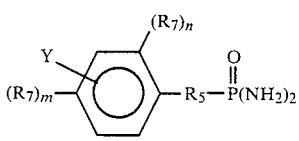

and acid salts therof, wherein:

Y is nitro, hydrogen, amino, hydroxy or alkyl;

n and m are the same or different and are 0 or 1, provided that at least one of n and m is one;

$R_5$ is oxygen or a moiety of the formula:

wherein:

$R_6$ is hydrogen, phenylethyl, phenylmethyl, methyl, ethyl, cyclohexyl or phenyl; and $R_7$ is the same or different at each occurence and is hydroxy, mercapto, amino or a moiety of the formula —OM or —SM wherein:

M is an alkali metal cation; with the proviso that at least one of $R_7$ and $R_5$ includes a divalent oxygen bonded to the phenyl ring.

Especially effacious compounds for use in the practice of this invention are 4-aminophenylphosphorodiamidate, N-methyl-N-(4-hydroxyphenyl) phosphoric triamide, and phosphorodiamidic acid 3-(1',1'-dimethylethyl)-4-hydroxyphenyl ester.

Compounds for use in the practice of this invention can be prepared in accordance with the following reaction scheme:

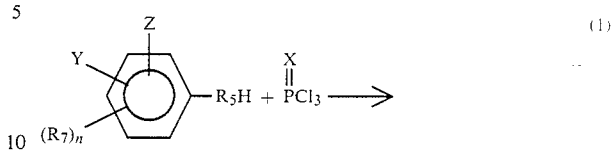

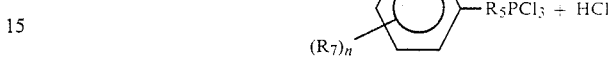

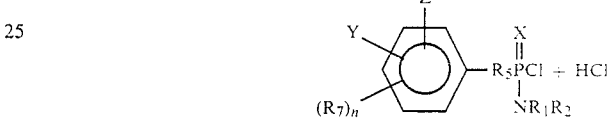

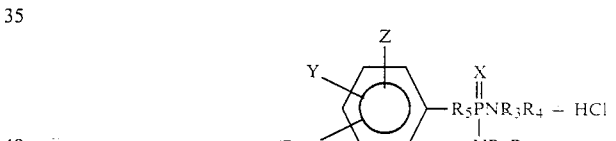

In the above reaction scheme, $R_1$, $R_2$, $R_3$, $R_4$, $R_5$, $R_7$, X, Y and Z are as defined above.

The aforementioned reaction is described in more detail in East German Pat. No. 128,315, Roth, H. J., et al., Synthesis of Phenyl Phosphorodiamidates. Part I., Arch. Pharm., 314, pp. 85-91 (1980), and references cited therein and E. Cherbuliez in "Organic Phosphorous Compounds" ed. G. M. Kosolopoff and L. Maier. Vol. 6 Chap. 15, Wiley-Interscience, 1973, and E. Fluck and W. Karlbald, ibid., Chapter 16. Accordingly, they will not be described herein in great detail.

Briefly stated in each step of the three step reaction sequence, substantially equal molar amounts or excesses of the reactants are contacted neat or in an inert solvent with or without a hydrogen chloride acid acceptor. Useful inert reaction solvents include ethyl ether, carbon tetrachloride, methylene chloride, benzene, dioxane, toluene, xylene, tetrahydrofuran, methyl sulfoxide, dimethylformamide, and the like.

The hydrogen chloride acid acceptor employed is a basic material which can be either an inorganic or organic base. Suitable inorganic bases include alkali metal carbonates such as sodium carbonate, potassium carbonate and the like. Organic bases which are useful and are preferred are tertiary amines, as for example pyridine, lutidine, 1,4-diazabicyclo[2.2.2]octane, isoquinoline, quinoline, N-methylpiperidine, trimethylamine, triethylamine, and the like.

Reaction temperatures and pressures are not critical. The reaction can be conveniently carried out at a temperature of from about −30° C. to about 250° C., but is preferably carried out at a temperature of from about 0° C. to about 125° C. The reaction can be carried out at sub-atmospheric, atmospheric or super-atmospheric pressure. However, for convenience the reaction is usually carried out at atmospheric or autogeneous pressure.

The order in which the reactants are reacted indicated in the reaction scheme is for illustrative purposes only, and the order of reaction is not critical.

The exact proportions of the reactants are not critical, some of the desired product being obtained when the reactants are employed in any proportions. However, in going to completion, the reaction consumes the reactants and the hydrogen chloride acceptor in substantially equimolar proportions, and the use of the reactants and the hydrogen chloride acceptor in such proportion, is preferred, although, however, an excess of the acceptor can be used.

Reaction times are not critical and can be varied widely depending on such factors as the reaction temperature, reactivity of the reactants and the like. The mixture is held within the desired reaction temperature range for a period of time, conveniently from about 30 min to 8 hours before cooling. Good yields are obtained with reaction times of from about 2 to 4 hours.

During the reaction, the hydrochloride salt of the hydrogen chloride acceptor forms and may precipitate from the mixture. This salt can be removed by such conventional procedures as extraction filtration or centrifugation. The phosphoro product can be separated by such conventional procedures as evaporation and purified by conventional procedures such as distillation and extraction. The product separated as described above may be employed in the control of urease in the soil in accordance with this invention or may be further purified by conventional procedures such as extraction and distillation.

The phosphoryl chloride and amine reactants for use in the above referenced reaction scheme are well known compounds which can be obtained from commercial sources or prepared in accordance with well known preparative techniques. Certain of the phenol and aminophenol reagents can be prepared in accordance with the procedures described in copending U.S. patent application Ser. No. 502,401 filed June 8, 1983 entitled "Aminophenol Urease Inhibitors and Urease Inhibited Urease Urea Based Fertilizer Compositions" filed concurrently herewith.

The following specific examples are present to more particularly illustrate the invention.

EXAMPLE I

Preparation of Phosphorodiamidic Acid 3-(1′,1′-dimethylethyl)-4-hydroxyphenyl Ester A. a stirred mixture of 33.2 g (0.20 mol) of tertbutylhydroquinone, 110 mL (184 g, 1.2 mol) of phosphorous oxychloride, and 0.6 g of potassium chloride was heated in a flask equipped with a condenser attached to a sodium hydroxide trap separated by a drying tube. Evolution of hydrogen chloride gas began at about 110° C. Heating was continued at reflux for 12 h, and then excess phosphorus oxychloride was removed by vacuum distillation. The crude phosphoro intermediate had the following NMR spectral characteristics:

$^1$H NMR (CDCl$_3$): δ 7.10 (m, 1, Ar$\underline{H}$), 6.95 (m, 1, Ar$\underline{H}$), 6.78 (m, 1, Ar$\underline{H}$), 6.02 (s, 1, O$\underline{H}$), and 1.39 ppm (s, 9, t-Bu).

$^{31}$P NMR showed one major peak at δ 6.6 ppm, while a computer simulated spectrum and $^{13}$C NMR indicated that the phosphorus was attached to the oxygen meta to the tert-butyl group.

B. The crude product from above was dissolved in about 350 mL of ether, filtered free of inorganic salts, and added dropwise to 1000 mL of cold (0° C.) ether continuously saturated with ammonia gas. The addition was complete in 1.5 h. After the addition, the ice-bath was removed and stirring was continued for another 30 min. A gummy residue formed in the flask. The ether was decanted and evaporated to give 19.3 g of a pale orange oil. The residue in the flask was extracted with 1000 mL of acetone which, after evaporation, provided another 22.5 g of an almost colorless oil which had the same $^1$H NMR as the orange oil. The oils were combined in a 2000 mL beaker and placed under high vacuum at 35°–40° C. The oil foamed into a crystalline mass that was broken-up into an amorphous tan powder and which had a mp of 57°–58° C.

$^1$H NMR (acetone-d$_6$): δ 7.8–6.2 (m, 3, Ar$\underline{H}$), 4.4–3.9 (br m, 5, O$\underline{H}$ and N$\underline{H}_2$), and 1.39 (5,9, t-Bu);

Mass spectrum (C.I.—NH$_3$): m/e 245 (MH+).

EXAMPLE II

Preparation of N-(Methyl)-N-(4-hydroxyphenyl) Phosphoric triamide

A mixture of p-(N-methylamino)phenol sulfate (13.6 g, 80 mmol), calcium carbonate (15 g, 160 mmol and water (30 mL) was triturated with mortar and pestil, and repeatedly extracted with ether (8×60 mL). The combined ether extracts were washed with water, and dried with anhydrous sodium sulfate. The solution was then evaporated to dryness, and the solid residue dried in vacuum over phosphorus pentoxide at ambient temperature to provide 7.32 g (60 mmol) of p-(N-methylamino)phenol. To anhydrous ether (240 mL) was added pyridine (4.8 mL, 60 mmol) and p-(N-methylamino)phenol 7.32 g (60 mmol). The resulting solution was added dropwise to a cooled solution (0° C.) of phosphorous oxychloride (5.4 mL, 60 mmol) in ether (100 mL) with stirring under nitrogen. The reaction mixture was stirred at room temperature for 60 minutes, filtered, and the filtrate added dropwise to a saturated solution of anhydrous ammonia in ether (450 mL, 0° C.). The reaction mixture was allowed to warm to room temperature with stirring (60 minutes). A white precipitate formed which was isolated by filtration, rinsed with ether and dried in vacuum over phosphorous pentoxide at room temperature.

EXAMPLE III

Preparation of 4-aminophenylphosphorodiamidate

A. 4-nitrophenylphosphorodiamidate. A solution of 25.6 g (100 mmol) of commercially purchased 4-nitrophenylphosphorodichloridate in 1400 mL of methylene chloride was placed in a dry, 1000 mL flask fitted with a mechanical stirer, a stopper, and a condenser attached to a nitrogen inlet. The solution was cooled to 0° C. in an ice bath and the stopper was replaced with a fritted gas inlet tube attached to an ammonia cylinder. Ammonia gas was then rapidly bubbled into the vigorously stirred solution until it became strongly alkaline (about one hour). The resulting slurry of product and ammonium chloride was filtered, washed first with methylene chloride, and then once with 50 mL of ice-water. After preliminary drying under nitrogen, the product was completely dried at 50° C. over $P_2O_5$ in a vacuum to give 18.1 g (83%) of 4-nitrophenylphosphorodiamidate, mp 176.5–129.5, largelly free from ammonium chloride.

$^1$H NMR (DMSO-$d_6$): δ 8.26 (d, 2, Ar$\underline{H}$, 7.44 (dd, 2, Ar$\underline{H}$), and 4.62 pm (br d, 4, N$\underline{H}_2$).

$^{31}$P NMR (DMSO-$d_6$): δ 15.0 ppm.

Mass Spectrum (70 eV); m/e 217 (M+), 109, and 79 (Base).

B. 4-Aminophenylphosphorodiamidate. A well stirred solution of 10.75 g (50 mmol) of 4-nitrophenylphosphorodiamidate in 300 mL of dimethylformamide was hydrogenated over 1 g of 5% palladium on charcoal at room temperature for 90 min at an initial hydrogen pressure of 250 psi. The catalyst was then removed by filtration, and the filtrate was concentrated on a rotary evaporator. The crude product was then heated overnight at 60° C. with a solution of 50 mL of diethylamine and 250 mL of chloroform to remove residual starting materials and by-products. After cooling to room temperature, 8.6 g (92%) of partially purified product was isolated by filtration. The product was then boiled with 900 mL of isopropanol and the hot solution was filtered free of residue. The filtrate was evaporated to give 7.7 g of the product as a tan solid. Recrystallization of this material from 700 mL of isopropanol (after decolorization with charcoal) provided 6.8 g (72%) of 4-aminophenylphosphorodiamidate as a light tan solid, mp 112°–115° C. (strinkage), 125°–135° C. (melting), 155° C. (dec).

$^1$H NMR (DMSO-$d_6$): δ7.5–6.3 (br s, 2, ArN$\underline{H}_2$), 6.84 (dd, 2, Ar$\underline{H}$), 6.38 (d, 2, Ar$\underline{H}$), and 4.26 ppm (br s, 4, N$\underline{H}_2$).

$^{31}$P NMR (DMSO-$d_6$): δ14.4 ppm.

Mass Spectrum (70 eV): m/e 187 (M+), 109 (BASE), and 80.

EXAMPLE IV

Urease Inhibition Efficacy Test

Efficacy tests were conducted to evaluate the efficacy of certain representative phosphoric triamide compounds of this invention as urease inhibitors in comparison with the known compound 4-aminophenylphosphoric triamide. The inhibition tests were run in a New York soil (Cazenovia silt loam, pH 7.0), or in Wisconsin soil (Plano silt loam). Evaluations (run in triplicate) consisted of applying 800 micrograms of the test compound in 5 mL of water and 42.8 mg of urea in 1 mL of water to 20 g of air-dry soil in a glass bottle. The bottle was capped with perforated aluminum foil and incubated at 25° C. for three days prior to extraction with 100 mL of a 2M KCl solution containing 0.5 mg of phenylmercuric acetate. The extracts were then analyzed for remaining urea using an autoanalyzer. Percent inhibition was calculated as $$\% \text{ Inhibition} = \left(1 - \frac{A - B}{A - C}\right) \times 100\%$$

where A is urea recovered from unincubated sample (urea added to soil and immediately extracted); B is urea recovered from inhibited sample; and C is urea recovered from the control (uninhibited sample).

The results of these test are set forth in the following Table I.

TABLE I

| Experiment Number | Compound | % Inhibition 40 Micrograms per gram soil | |
|---|---|---|---|
| | | Cazenovia pH 7.2 | Wisconsin pH 5.4 |
| 1. | N—Methyl-N—(4-hydroxyphenyl)-phosphoric triamide | 87 | 33 |
| 2. | Phosphorodiamidic Acid 3-(1',1'-dimethylethyl)-4-hydroxyphenyl Ester | 87 | Not Tested |
| 3. | 4-Aminophenylphosphorodiamidate | 91 | Not Tested |
| 4. | 4-Aminophenylphosphoric triamide | 55 | Not Tested |

EXAMPLE V

Efficacy tests were also conducted with jack bean urease. The procedure of Bremner (see L. A. Douglas. J. M. Bremner, Soil Biol. Biochem., 3, 859–62 (1970 and references therein) was modified by replacing the soil as the source of urease with commercial purified jack bean urease (Sigma, Type IX). The incubation then proceeds in homogeneous solution. The results are generally parallel to those obtained in the soil test of Example IV and are given in Table II.

TABLE II

| Experiment Number | Compound | % Inhibition $10^{-6}$ M |
|---|---|---|
| 1. | N—Methyl-N—(4-hydroxyphenyl) phosphoric triamide | Not Tested |
| 2. | Phosphorodiamidic Acid 3-(1',1'-dimethylethyl)-4-hydroxyphenyl Ester | 29 |
| 3. | 4-Aminophenyl-phosphorodiamidate | 80 |
| 4. | 4-Aminophenyl-phosphoric triamide | 0 |

EXAMPLE VI

Nitrification Inhibition Efficacy Test

Efficacy tests were conducted to evaluate the efficacy of certain representative phosphoric triamide compounds as nitrification inhibitors. All compounds were evaluated in Cazenovia silt loam soil (pH 7.3). The evaluations consisted of applying either simultaneously ($t_o$) or after 14 days ($t_{14}$) a solution of 6.00 mg (300 μg/g soil) at diammonium phosphate in 1 mL of water to triplicate 20 g samples of air dry soil contained in 250 mL square glass bottles that had been treated with a solution of either 0 or 0.800 mg (40 μg/g soil) of the test compound in 5 mL of water. Each bottle was capped with perforated aluminum foil, incubated for 14 days at 25° C. after diammonium phosphate application, and then extracted with 100 mL of 2M potassium chloride containing 0.5 mg (5 mg/L) of phenylmercuric acetate. Each extract was allowed to settle, and an aliquot was frozen and then analyzed for nitrate using an autoanalyzer. The percent inhibition obtained during the incubation was calculated by the formula:

$$\% \text{ Inhibition} = \left(1 - \frac{C - A}{B - A}\right) \times 100\%$$

where A is the nitrate recovered from unincubated soil before diammonium phosphate addition; B is nitrate recovered from uninhibited soil; and C is nitrate recovered from inhibited soil.

The results of the tests are set forth in the following Table III.

TABLE III

| | Inhibition of Soil Nitrification | | |
|---|---|---|---|
| | | \% Inhibition at 40 μg per gram of soil | |
| Experiment No. | Compound | $t_0$ | $t_{14}$ |
| 1 | Phosphorodiamidic Acid 3-(1,'1'-dimethylethyl)-4-hydroxyphenyl Ester | 39 | 0 |

What is claimed is:

1. A composition comprising an acceptable carrier and a urease inhibiting effective amount of one or more compounds of the formula:

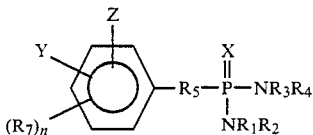

wherein:
X is oxygen or sulfur;
n is 1, 2 or 3;
Z and Y are the same or different and are hydrogen, alkyl, aryl, heterocycle, alkenyl, aralkyl, alkaryl, nitro, cyano, halogen, trihalomethyl, hydroxy, mercapto, carboxy, carbamyl, alkylmercapto, amino, dialkylamino, phenoxy, sulfonic acid, alkoxy, or Z or Y together may form an alkylene or alkenylene chain which may optionally include one or more heteroatoms of divalent oxygen, sulfur or nitrogen to form a fused or spiro aromatic, cycloaliphatic or heterocyclic ring structure;
$R_1$, $R_2$, $R_3$ and $R_4$ are the same or different and are hydrogen or alkyl having from 1 to about 4 carbon atoms;
$R_5$ is devalent oxygen or a divalent moiety of the formula:

wherein:
$R_6$ is hydrogen, or unsubstituted or substituted phenyl, cycloalkyl, or alkyl wherein permissible substituents are one or more halogen, mercapto, nitro, cyano, carboxyalkyl, amido, alkylmercapto, aryloxy, acyloxy, carboxy, amino, dialkylamino, N-diaminophosphinyl, O-diaminophosphinyl, S-diaminophosphinyl, N-(diaminophosphinyl)carbamyl, diaminophosphinyl, biscarboxyalkyl, alkylcarbonyl, hydroxy and thiocyano; and
$R_7$ is hydroxy, mercapto or a moiety of the formula:

—OM, —SM, or —$NR_8R_9$ wherein:
M is a metal cation; and
$R_8$ and $R_9$ are the same or different and are selected from the group consisting of permissible $R_6$ groups; with the proviso that at least one $R_7$ group is substituted at the ortho or para position relative to the $R_5$ group and that at least one of $R_5$ and $R_7$ contains a divalent oxygen bonded to the phenyl ring.

2. A composition according to claim 1 wherein said urease inhibiting amounts is at least about 0.00001 weight percent based on the total weight of the composition.

3. A composition according to claim 2 wherein said amount is from about 0.0001 to about 98 weight percent.

4. A composition according to claim 3 wherein said amount is from about 0.002 to about 50 weight percent.

5. A composition according to claim 4 wherein said amount is from about 0.01 to about 20 weight percent.

6. A composition according to claim 1 wherein X is oxygen.

7. A composition according to claim 1 wherein $R_7$ is hydroxy, mercapto, amino or a moiety of the formula:

—OM or —SM wherein:
M is a metal cation.

8. A composition according to claim 7 wherein M is an alkali metal cation.

9. A composition according to claim 8 wherein $R_7$ is an hydroxy, amino or —OM.

10. A composition according to claim 8 wherein Y and Z are the same or different and are hydrogen, halogen, alkyl having from about 1 to about 7 carbon atoms, amino, trifluoromethyl, cyano, carboxy, nitro, hydroxy or alkoxy having from about 1 to 7 carbon atoms.

11. A composition according to claim 10 wherein Y and Z are individually hydrogen, amino, nitro, carboxy, cyano, chloro, bromo, fluoro, methoxy, ethoxy or alkyl having from 1 to about 7 carbon atoms.

12. A composition according to claim 11 wherein Y and Z are individually hydrogen or alkyl.

13. A composition according to claim 1 wherein n is 1 to 2.

14. A composition according to claim 13 wherein n is 1.

15. A composition according to claim 1 wherein $R_1$, $R_2$, $R_3$ and $R_4$ are the same or different and are hydrogen, methyl or ethyl.

16. A composition according to claim 15 wherein $R_1$, $R_2$, $R_3$ and $R_4$ are hydrogen.

17. A composition according to claim 1 wherein $R_5$ is divalent oxygen or a divalent moiety of the formula:

wherein:
$R_6$ is hydrogen, or substituted or unsubstituted alkyl, phenyl or cycloalkyl wherein permissible substituents are one or more halogen, cyano, nitro, alkoxy, alkyl, phenyl or phenoxy groups.

18. A composition according to claim 17 wherein $R_5$ is divalent oxygen.

19. A composition according to claim 17 wherein $R_5$ is a divalent moiety of the formula:

20. A composition according to claim 19 wherein $R_6$ is hydrogen, alkyl, phenylalkyl, cycloalkyl or phenyl.

21. A composition according to claim 1 wherein said compounds are of the formula:

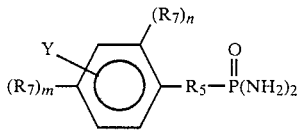

and acid salts thereof, wherein:
n and m are the same or different, and are 0 or 1 with the proviso that at least one of n and m is one;
Y is nitro, amino, hydrogen, hydroxy or alkyl; and
$R_5$ is divalent oxygen or a divalent moiety of the formula:

wherein:
$R_6$ is hydrogen, phenylethyl, cyclohexyl, phenylmethyl, methyl, ethyl, or phenyl.

22. A method of inhibiting the urease catalyzed hydrolysis of urea at a situs which comprises applying to said situs a urease inhibiting effective amount of one or more compounds of the formula:

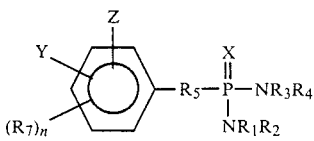

wherein:
X is oxygen or sulfur;
n is 1, 2 or 3;
Z and Y are the same or different and are hydrogen, alkyl, aryl, heterocycle, alkenyl, aralkyl, alkaryl, nitro, cyano, halogen, trihalomethyl, hydroxy, mercapto, carboxy, carbamyl, alkylmercapto, amino, dialkylamino, phenoxy, sulfonic acid, alkoxy, or Z and Y together may form an alkylene or alkenylene chain which may optionally include one or more heteroatoms of divalent oxygen, sulfur or nitrogen to form a fused or spiro aromatic, cycloaliphatic or heterocyclic ring structure;
$R_1$, $R_2$, $R_3$ and $R_4$ are the same or different and are hydrogen or alkyl having from 1 to about 4 carbon atoms;
$R_5$ is divalent oxygen or a divalent moiety of the formula:

wherein:
$R_6$ is hydrogen, or unsubstituted or substituted phenyl, cycloalkyl, or alkyl wherein permissible substituents are one or more halogen, mercapto, nitro, cyano, carboxyalkyl, amido, alkymercapto, aryloxy, acyloxy, carboxy, amino, dialkylamino, N-diaminophosphinyl, O-diaminophosphinyl, S-diaminophosphinyl, N-(diaminophosphenyl)carbamyl, diaminophosphinyl, bis-carboxyalkyl, alkylcarbonyl, hydroxy and thiocyano; and
$R_7$ is hydroxy, mercapto or a moiety of the formula:

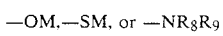

wherein:
M is a metal cation; and
$R_8$ and $R_9$ are the same or different and are selected from the group consisting of permissible $R_6$ groups; with the proviso that at least one $R_7$ group is substituted at the ortho or para position relative to the $R_5$ group and that at least one of $R_5$ and $R_7$ contains a divalent oxygen bonded to the phenyl group.

23. A method according to claim 22 wherein said situs is a plant growth media.

24. A method according to claim 23 wherein said urease inhibiting effective amount is at least about 0.01 p.p.m.

25. A method according to claim 24 wherein said urease inhibiting effective amount is from about 0.01 p.p.m. to about 5,000 p.p.m.

26. A method according to claim 25 wherein said urease inhibiting effective amount is from about 0.2 p.p.m. to about 1000 p.p.m.

27. A method according to claim 26 wherein said urease inhibiting effective amount is from about 1 p.p.m. to about 500 p.p.m.

28. An improved fertilizer composition which comprises urea or one or more compounds which are capable of forming urea in situ under the use conditions of the composition, and a urease inhibiting effective amount of one or more compounds of the formula:

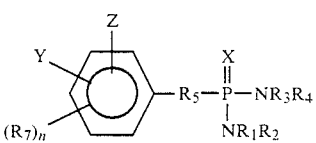

and acid salts thereof, wherein:
X is oxygen or sulfur;
n is 1,2 or 3;
Z and Y are the same or different and are hydrogen, alkyl, aryl, heterocycle, alkenyl, aralkyl, alkaryl, nitro, cyano, halogen, trihalomethyl, carboxy, carbamyl, alkylmercapto, amino, dialkylamino, phenoxy, sulfonic acid, hydroxy, mercapto, or alkoxy, or Z and Y together may form an alkylene or alkenylene chain which may optically include one or more heteroatoms of divalent oxygen, sulfur or nitrogen to form a fused or spiro aromatic, cycloaliphatic or heterocyclic ring structure;
$R_1$, $R_2$, $R_3$ and $R_4$ are the same or different and are hydrogen or alkyl having from 1 to about 4 carbon atoms;
$R_5$ is divalent oxygen or a divalent moiety of the formula:

wherein:
R$_6$ is hydrogen, or unsubstituted or substituted phenyl, cycloalkyl, or alkyl wherein permissible substituents are one or more halogen, mercapto, nitro, cyano, carboxyalkyl, amido, alkymercapto, aryloxy, acyloxy, carboxy, amino, dialkylamino, N-diaminophosphinyl, O-diaminophosphinyl, S-diaminophosphinyl, N-(diaminophosphinyl)carbamyl, diaminophosphinyl, bis-carboxyalkyl, alkylcarbonyl, hydroxy and thiocyano; and R$_7$ is hydroxy, mercapto or a moiety of the formula:

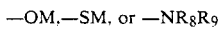

wherein:
M is a metal cation; and
R$_8$ and R$_9$ are the same or different and are selected from the group consisting of permissible R$_6$ groups; with the proviso that at least one R$_7$ group is substituted at the ortho or para position relative to the R$_5$ group and that at least one of R$_5$ and R$_7$ contains a divalent oxygen bonded to the phenyl ring.

29. A method of ehancing plant growth and crop yield which comprises applying an effective amount of the composition according to claim 28 to a plant growth medium with the root zone of said plant.

30. A method of inhibiting the nitrification of reduced nitrogen fertilizers which comprises applying to a plant growth medium a nitrification inhibiting effective amount of one or more compounds of the formula:

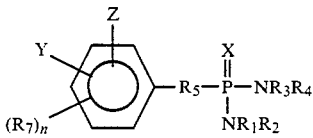

wherein:
X is oxygen or sulfur;
n is 1, 2 or 3;
Z and Y are the same or different and are hydrogen, alkyl, aryl, heterocycle, alkenyl, aralkyl, alkaryl, nitro, cyano, halogen, trihalomethyl, hydroxy, mercapto, carboxy, carbamyl, alkylmercapto, amino, dialkylamino, phenoxy, sulfonic acid, alkoxy, or Z and Y together may form an alkylene or alkenylene chain which may optionally include one or more heteroatoms of divalent oxygen, sulfur or nitrogen to form a fused or spiro aromatic, cycloaliphatic or heterocyclic ring structure;
R$_1$, R$_2$, R$_3$ and R$_4$ are the same or different and are hydrogen or alkyl having from 1 to about 4 carbon atoms;
R$_5$ is divalent oxygen or a divalent moiety of the formula:

wherein:
R$_6$ is hydrogen, or unsubstituted or substituted phenyl, cycloalkyl, or alkyl wherein permissible substituents are one or more halogen, mercapto, nitro, cyano, carboxyalkyl, amido, alkymercapto, aryloxy, acyloxy, carboxy, amino, dialkylamino, N-diaminophosphinyl, O-diaminophosphinyl, S-diaminophosphinyl, N-(diaminophosphinyl)carbamyl, diaminophosphinyl, bis-carboxyalkyl, alkylcarbonyl, hydroxy and thiocyano; and R$_7$ is hydroxy, mercapto or a moiety of the formula:

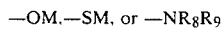

wherein:
M is a metal cation; and
R$_8$ and R$_9$ are the same or different and are selected from the group consisting of permissible R$_6$ groups; with the proviso that at least one R$_7$ group is substituted at the ortho or para position relative to the R$_5$ group and that at least one of R$_5$ and R$_7$ contains a divalent oxygen bonded to the phenyl ring.

31. A composition comprising a nitrification inhibiting effective amount of one or more compounds of the formula:

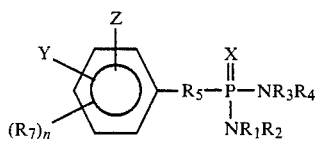

wherein:
X is oxygen or sulfur; n is 1, 2 or 3;
Z and Y are the same or different and are hydrogen, alkyl, aryl, heterocycle, alkeryl, aralkyl, alkaryl, nitro, cyano, halogen, trihalomethyl, hydroxy, mercapto, carboxy, carbamyl, alkylmercapto, amino, dialkylamino, phenoxy, sulfonic acid, alkoxy, or Z or Y together may form an alkylene or alkenylene chain which may optionally include one or more heteroatoms of divalent oxygen, sulfur or nitrogen to form a fused or spiro aromatic, cycloaliphatic or heterocyclic ring structure;
R$_1$, R$_2$, R$_3$ and R$_4$ are the same or different and are hydrogen or alkyl having from 1 to about to 4 carbon atoms;
R$_5$ is divalent oxygen or a divalent moiety of the formula:

wherein:
R$_6$ is hydrogen, or unsubstituted or substituted phenyl, cycloalkyl, or alky wherein permissible substituents are one or more halogen, mercapto, nitro, cyano, carboxyalky, amido, alkymercapto, aryloxy, acyloxy, carboxy, amino, dialkylamino, N-diaminophosphinyl, O-diaminophosphinyl, S-diaminophosphinyl, N-(diaminophosphinyl)carbamyl, diaminophosphinyl, bis-carboxyalkyl, alkylcarbonyl, hydroxy and thiocyano; and R$_7$ is hydroxy, mercapto or a moiety of the formula:

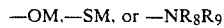

wherein:
M is a metal cation; and $R_8$ and $R_9$ are the same or different and are selected from the group consisting of permissible $R_6$ groups; with the proviso that at least one $R_7$ group is substituted at the ortho or para position realtive to the $R_5$ group and that at least one of $R_5$ and $R_7$ contains a divalent oxygen bonded to the phenyl ring.

32. A composition according to claim 31 which further comprises one or more reduced nitrogen fertilizers.

33. A composition according to claim 1 wherein said carrier is a liquid.

34. A composition according to claim 33 wherein said liquid carrier is selected from the group consisting of water and organic liquids.

35. A composition according to claim 1 wherein said carrier is a finely divided inert solid.

* * * * *

UNITED STATES PATENT AND TRADEMARK OFFICE
CERTIFICATE OF CORRECTION

PATENT NO. : 4,517,004
DATED : May 14, 1985
INVENTOR(S) : M. D. Swerdloff et al.

It is certified that error appears in the above–identified patent and that said Letters Patent are hereby corrected as shown below:

On the title page:

In the title, "ARYL PHOSPHORIC TRIAMIDE AND ARYL PHOSPHORO-DIAMIDATE UREASE AND NITRIFICATION INHIBITORS AND UREASE AND NITRIFICATION INHIBITED UREA AND REDUCED NITROGEN BASED FERTILIZER COMPOSITIONS" should read -- NOVEL ARYL PHOSPHORIC TRIAMIDE AND ARYL PHOSPHORODIAMIDATE UREASE AND NITRIFICATION INHIBITORS AND UREASE AND NITRIFICATION INHIBITED UREA AND REDUCED NITROGEN BASED FERTILIZER COMPOSITIONS --

UNITED STATES PATENT AND TRADEMARK OFFICE
CERTIFICATE OF CORRECTION

PATENT NO. : 4,517,004
DATED : May 14, 1985
INVENTOR(S) : M. D. Swerdloff et al.

It is certified that error appears in the above-identified patent and that said Letters Patent are hereby corrected as shown below:

Col. 21, line 50, "devalent" should read -- divalent --.

line 61, "alkylmercapto" should read --alkymercapto--.

Col. 24, line 59, "optically" should read -- optionally --.

Col. 26, line 33, "alkeryl" should read -- alkenyl --.

line 55, "alky" should read -- alkyl --.

line 57, "carboxyalky" should read -- carboxyalkyl --.

Signed and Sealed this

Seventeenth Day of December 1985

[SEAL]

Attest:

DONALD J. QUIGG

Attesting Officer      Commissioner of Patents and Trademarks